Figure 1:
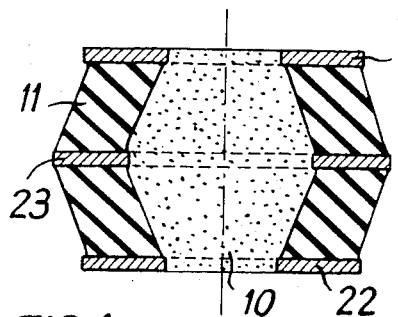

United States Patent [19]
Hamel et al.

[11] 3,806,106
[45] Apr. 23, 1974

[54] ELASTOMERIC LOAD SUPPORTS
[75] Inventors: Denis Hamel, Saint-Mande; Paul Salengro, Paris, both of France
[73] Assignee: Pneumatiques Caoutchouc Manufacture et Plastiques Kleber-Colombes, Colombes, France
[22] Filed: Jan. 12, 1972
[21] Appl. No.: 217,132

[30] Foreign Application Priority Data
Jan. 14, 1971 France .............................. 71.01221

[52] U.S. Cl.................................. 267/152, 267/63
[51] Int. Cl............................................... F16f 3/08
[58] Field of Search.................... 267/63 R, 152, 153

[56] References Cited
UNITED STATES PATENTS
3,606,295  9/1971  Appleton ........................... 267/63 R
3,687,440  8/1972  Jarret et al. ....................... 267/63 R
3,134,585  5/1964  Trask .................................. 267/153

Primary Examiner—James B. Marbert
Attorney, Agent, or Firm—Brisebois and Kruger

[57] ABSTRACT

In elastomeric supports normally operating under compression, the invention provides a support that includes a core made from a very flexible cellular elastomer, the sides of which are surrounded by an outer rubber casing which deforms outwardly under flexing load and this outer casing is associated with reinforcing members to limit the radial outward expansion. In this way, the resistance to compression of the support and also its horizontal stability are increased without causing vertical stiffening within a wide range of loads. The reinforcing element may be an inextensible hoop on the outside or the inside of the casing and several similar supports may be superimposed about a common core to make up a composite support.

6 Claims, 10 Drawing Figures

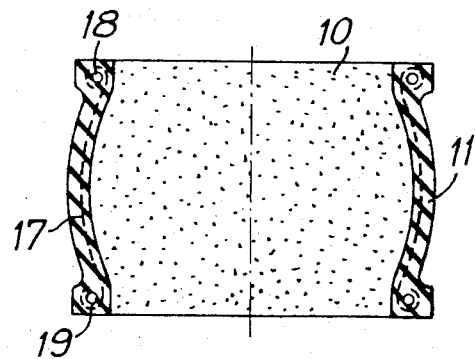
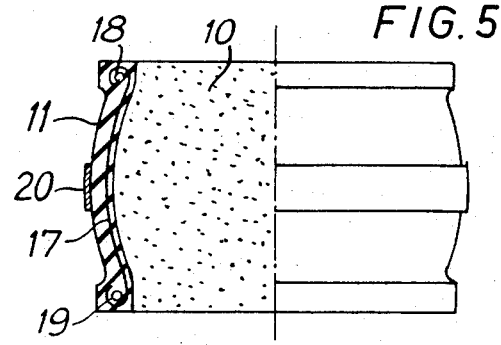

ELASTOMERIC LOAD SUPPORTS

The present invention relates to flexible elastomeric supports operating normally under compression to support a load. A support of this kind has the advantage of damping small-amplitude vibrations, preventing direct transmission of sound waves, and enabling vertical movement of the load by ensuring its resilient return in the manner of a spring. Finally, such supports may, in some cases, enable relative horizontal movements, the elastomer, e.g., rubber, thus working in horizontal shear whilst being compressed by the load.

In flexible supports of this kind made from solid rubber or rubber laminated with metal plates, the rigidity of the rubber in compression increases rapidly in dependence upon the load, so that when the unitary pressure exerted by the load in the static state is relatively high, the possibility of a supplementary flexing of the rubber in compression is small. This signifies that the suspension of the load by the rubber becomes stiff very rapidly. Moreover, when the unitary pressure is high in the rubber working continuously in compression, sooner or later permanent deformation of the rubber due to creep is observed which lessens the initial damping properties of the support as well as its capacity for elastic deformation in response to the movements of the load.

Thus, in some vehicle suspensions, hollow elastomeric springs are used, the walls of which operate by bending to support the load and to follow the movements thereof. Compared with the supports made from solid elastomers such as rubber operating under pure compression, such hollow springs have a much greater vertical deflection but a considerably smaller load capacity.

This load capacity may be increased when the inner cavity of the hollow spring is closed to form a pneumatic cushion or is filled with cellular elastic material such as polyurethane foam. In this case, the resistance to compression is ensured substantially by air or the cellular material and the walls of the hollow springs form primarily a protective enclosure. Such hollow springs or springs filled with cellular material have bad lateral stability and, when their height is large, they require means for vertical guiding of the load.

It is a primary object of the invention to minimise or avoid these drawbacks so that a consequential object is to produce flexible supports of greater vertical deflection than hitherto and which have a compression rigidity which varies slightly within a wide range of loads so that even under relatively high unitary pressures they can still have a high elastic deformation. It is a further object of the invention to produce flexible supports having a good resistance to permanent deformation and to creep under load, as well as good lateral stability.

The invention consists in a flexible elastomeric support comprising a core made from a very flexible cellular elastomer arranged for operation under compression surrounded laterally by an outer rubber casing arranged to deform essentially outwardly under flexion, wherein said outer casing is associated with reinforcing members to limit its radial outward expansion whereby the resistance to compression of said support, and its horizontal stability are increased without causing vertical stiffening within a wide range of loads.

Thus, by using a cellular elastic material that is naturally very compressible as compared with homogeneous rubber for operating under compression, and by enclosing the cellular material in a lateral casing made from rubber that flexes outwardly during operation, the whole support may be subjected to great crushing stresses without the risk of permanent deformation. However, the reinforcement of the enclosure for limiting its radial expansion when the support is crushed, increases the inherent resistance to compression of the core made from a cellular material and thus that of the assembly of the support, without appreciably altering its elasticity. This signifies that such a support may withstand a relatively high static load with a greater deflection than that of a compression spring made from homogeneous rubber but less than that of a hollow spring operating by deflection of the walls. From this deflected position under static load, supports according to the invention may further yield more particularly when the value of the load increases momentarily (for example as a result of an increase in load in a vehicle or as a result of vertical acceleration) without the support opposing a rapid stiffening effect. Such a support thus has linear elastic characteristics within a wide range of loads.

The reinforcing of the casing thus confers better horizontal stability by decreasing the tendency of the deflected support to roll laterally or to become deformed by buckling.

The compression rigidity of the cellular material and the bending rigidity of the casing may be selected to give to the entire composite support any desired intermediate rigidity. Moreover, this cellular material imparts advantageous return movement damping characteristics to the support.

Flexible supports according to the invention may be used in various application but more particularly in the field of vehicle suspensions, for example for supporting a vehicle body on a chassis or on a railway or road vehicle bogie.

Figure 2:
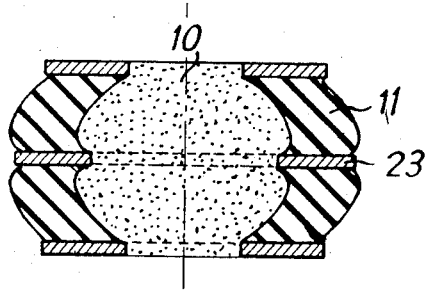
Figure 3:
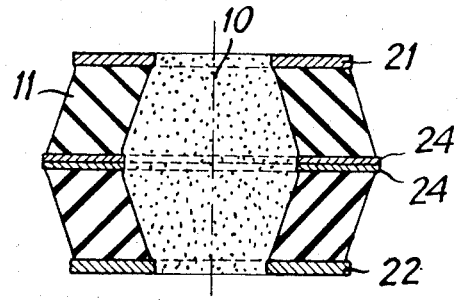
Figure 6:
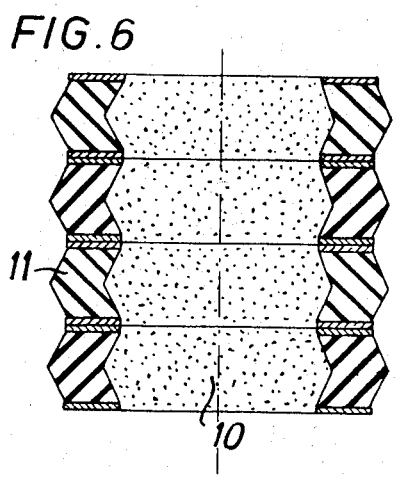
Figure 7:
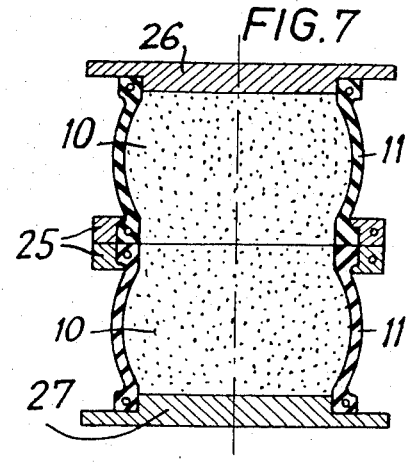
Figure 8:
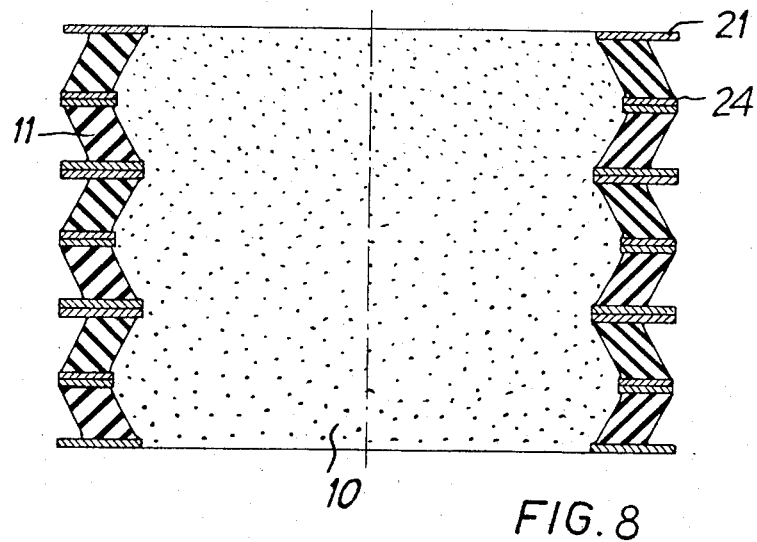
Figure 9:
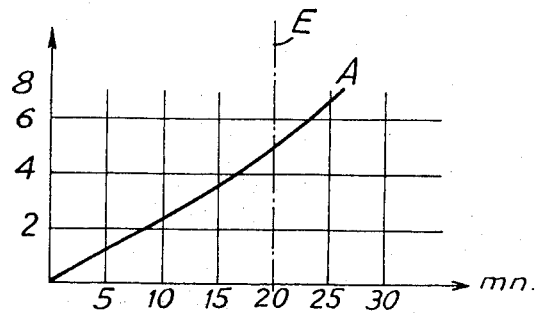
Figure 10:
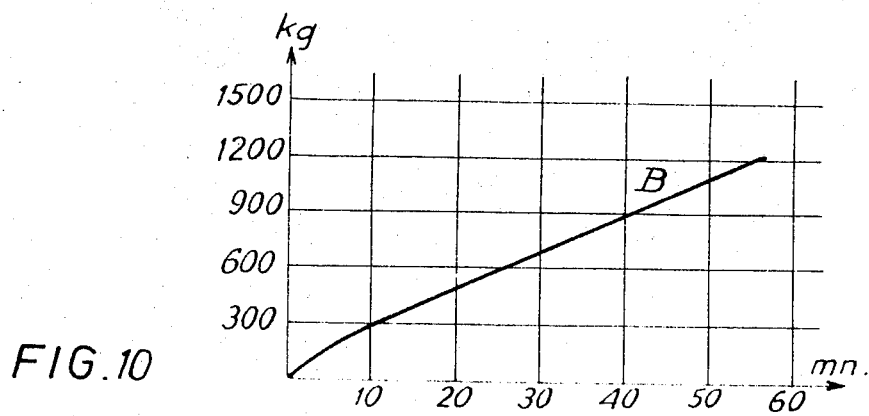

In order that the invention may be more clearly understood, reference will now be made to the accompanying drawings which show, somewhat schematically, some embodiments thereof by way of example, and in which:

FIGS. 1 and 2 show in sectional elevation a first embodiment of flexible support, at rest and under load respectively, FIGS. 3, 4 and 5 show other embodiments of supports at rest, FIGS. 3 and 4 being in sectional elevation and FIGS. 5 in part-sectional elevation, FIGS. 6 to 8 show in section three other supports made from constituent parts assembled together, and FIGS. 9 and 10 are diagrams for a flexible support according to FIG. 8.

Referring now to the drawings, the support shown in FIGS. 1 and 2 is constituted by a core 10 made from an extremely flexible elastomer, preferably an elastomer having an alveolar structure such as cellular polyurethane rubber, having by itself a small load capacity and a small rigidity in compression. This material can undergo a very high elastic crushing under load but has a compression rigidity almost constant up to the point of very high crushing stress. This core 10 is surrounded laterally by an outer casing 11 made from rubber having quite thick walls, forming a kind of hollow spring. The thickness of this casing 11 is substantially constant from one end to the other and it has a generally biconical shape with its median part projecting outwardly. The opposite end faces of this casing are adhered to metal plates 21–22 of appropriate shape serving as a support and, if desired, as a fixing means for the support as a whole. The casing is, moreover, subdivided in its median part by means of an intermediate plate 23 which acts as an annulus to limit the radial expansion of the casing when the support is compressed and which localises the bending of the casing 11 on both sides of the median horizontal plane.

When the support is deformed under the weight of a supported load as shown in FIG. 2, the core 10 operates substantially under compression and the casing 11 substantially under flexure. However, the median plate 23 for reinforcing the casing 11 opposes both radial expansion of the casing and radial expansion of the cellular core so that the load capacity of the resistance to compression of the latter is very substantially increased. The deflection of the assembly under static load is thus limited but it is nevertheless clearly greater than that which a member made from solid rubber operating solely under compression could take. On the other hand, from this deflected position under load the support assembly retains a large possibility of supplementary elastic deflection enabling larger vertical movements of the load before appreciable stiffening of the support occurs, which ensures a supple suspension of the load. The rigidity of deflection of the rubber of the casing 11 and the rigidity of compression of the cellular material of the core may be chosen to be extremely different to give the desired intermediate rigidity to the composite assembly. The meridian shape of the wall of the casing 11 and its thickness may be selected in relation to the desired characteristics of deformation.

FIG. 3 shows a modification of the support of FIGS. 1 and 2, according to which the outer casing 11 is made from two constituent sandwich layers of annular and identical truncated conical shape which are joined together by their large bases. Each sandwich layer comprises a casing member 11 made from rubber, annular and of truncated shape adhered at one end to a metal plate 21 of small diameter and at the other end to a metal plate 24 of larger diameter. On assembly, the two plates 24 form the equivalent of the single intermediate plate 23 of the support of FIGS. 1 and 2. This embodiment facilitates manufacture by moulding of the constituent sandwich layers.

FIG. 4 shows another embodiment of support in which the central part of the casing 11 has a swollen shape. This casing is reinforced internally by a carcass 17 formed for example from two layers of cables crossed on the bias. The edges of this carcass are coupled to rods 18–19 reinforcing the ends of the casing, said ends forming flanges therefor. Greater or lesser inclination of the cables with respect to generatrices of the casing enables its resistance to radial expansion and flexing to be varied and consequently the rigidity under compression of the assembly of the support to be modified.

FIG. 5 shows another embodiment of support, similar to that of FIG. 4, but with the difference that the central part of the casing 11 is hooped by an inextensible belt 20 which may be supple, for example made from fabric or textile or metal cables, or rigid, being formed for example by a strip or a metal ring. This belt may be placed outside of the casing to which it is adhered, or may be embedded in a groove in the casing or even embedded on the interior of the casing to ensure holding it in position. This belt localises the flexing zones of the casing on both sides of the central part. It thus increases the resistance to bending of the casing and the total resistance to compression of the support assembly. The casing 11 may further include a reinforcing carcass 17 which may be made from longitudinal wires or cables, the ends of which are coupled to rods 18–19 of flanges of the casing.

The supports hitherto described may be superimposed one on the other to form multiple supports of greater height having a large static and dynamic bending core. FIG. 6 shows for example a multiple support formed by superimposing four constituent supports. FIG. 7 shows a support formed from two constituent supports each of the kind shown in FIG. 4, superimposed and assembled together by means of collars 25, the ends of each part support being fixed to members 26–27 for linking to a carrying member of a load to be supported. In the two cases, the load may be applied to the upper face of the multiple support or to an intermediate part of the support, for example to the collars 25, the opposed free faces of the support thus being connected to the carrying member.

FIG. 8 shows another multiple support, the casing 11 of which is formed by assembling elementary sandwich layers each in the shape of a truncated zone similar to those of the support shown in FIG. 3, and comprising an annular rubber member in the shape of a truncated cone adhered to annular end plates 21 and 27 of different internal diameters. This casing 11 encloses an elastic core 10 common to the whole support assembly.

FIGS. 9 and 10 show the properties of a multiple support of the kind shown in FIG. 8. The curve A of FIG. 9 shows that the rigidity of compression of such a support used to support a railway vehicle body may be maintained substantially constant up to the limit E of static use of the supported load, namely 5 tons, corresponding to a deflection of 20 mm. The support is further capable of deflecting elastically beyond this limit E to absorb a momentary overload rising to 7 tons resulting for example from vertical acceleration in use, without a dangerous increase in the rigidity of compression, that is to say, without savagely hardening the suspension. The curve B of FIG. 10 shows that the rigidity of shear under a normal load of 5 tons remains almost constant, the horizontal displacement being virtually proportional to the value of the horizontal stresses exerted on the support.

Naturally, other embodiments could easily be conceived from the examples of supports described above. For example, the supports may have sections of non-circular shape, i.e., polygonal or elongated shapes, for example when the shear rigidity has to be different in several horizontal directions.

We claim:

1. A flexible support comprising a core member of cellular elastomeric material having, between its two axial ends, at least one median portion having a central part that has a longer radial dimension than the radial dimension of said axial ends, and a rubber envelope of substantially constant thickness surrounding said core, said envelope being arranged to deform essentially outwardly under flexion.

2. A flexible support according to claim 1, wherein said envelope extends continuously between said axial ends of said core, and wherein an inextensible ring-member surrounds said median portion of said core of larger radial dimensions so as to limit radial expansion of said median portion of said core.

3. A flexible support according to claim 1, wherein said envelope is formed by two annular frusto-conical sandwiches each comprising a rubber body of frusto-conical cross-section fixed to annular end-plates, said two sandwiches being joined together by their large bases.

4. A flexible support according to claim 3 wherein said core comprises, between said two axial ends of said core, a plurality of said median portions of larger radial dimension, wherein said envelope comprises a plurality of sections, one for each of said median portions of said core, and wherein each of said sections of said envelope is formed by two annular frusto-conical sandwiches each comprising a rubber body of frusto-conical cross-section fixed to annular end plates, said two sandwiches being joined together by their large bases.

5. A flexible support comprising a core member of cellular elastomeric material having, between its two axial ends, at least one median portion having a central part that has a larger radial dimension than the radial dimension of said axial ends, and a rubber envelope of substantially constant thickness surrounding said core, said envelope being arranged to deform essentially outwardly under flexion, said envelope extending continuously between said axial ends of said core and said envelope being reinforced by layers of cables extending obliquely to the longitudinal axis of said support.

6. A flexible support according to claim 5, wherein two layers of said reinforcing cables are present, said two layers being mutually crossed on the bias.

* * * * *